United States Patent [19]
Greenhalgh

[11] 3,813,061
[45] May 28, 1974

[54] PARACHUTIST S GLIDER

[76] Inventor: Howard N. Greenhalgh, East Hanover, N.J.

[22] Filed: Apr. 2, 1973

[21] Appl. No.: 346,950

[52] U.S. Cl. .............................................. 244/16
[51] Int. Cl. ........................................ B64c 31/04
[58] Field of Search ............ 244/11, 16, 22, 28, 43, 244/64, 137 R, 138 R, 138 A

[56] References Cited
UNITED STATES PATENTS

| | | | |
|---|---|---|---|
| 1,451,346 | 4/1923 | Seydel | 244/64 |
| 1,845,913 | 2/1932 | Goodman | 244/64 |
| 2,757,886 | 8/1956 | Correa | 244/64 |
| 3,679,157 | 7/1972 | Roberts et al. | 244/16 |

*Primary Examiner*—Duane A. Reger
*Assistant Examiner*—Jesus D. Sotelo
*Attorney, Agent, or Firm*—Jones and Lockwood

[57] ABSTRACT

A glider for use by a parachutist to provide an extended and controllable freefall prior to deployment of the user's parachute. The glider is provided with pivotable wings mounted on the fuselage of the craft and connected by means of hinged rods to a slidable hand operated control member whereby the wings may be moved by the user during flight to vary the glider's wingspan. Adjustable foot pedals for control of the glider's elevators are also provided.

6 Claims, 3 Drawing Figures

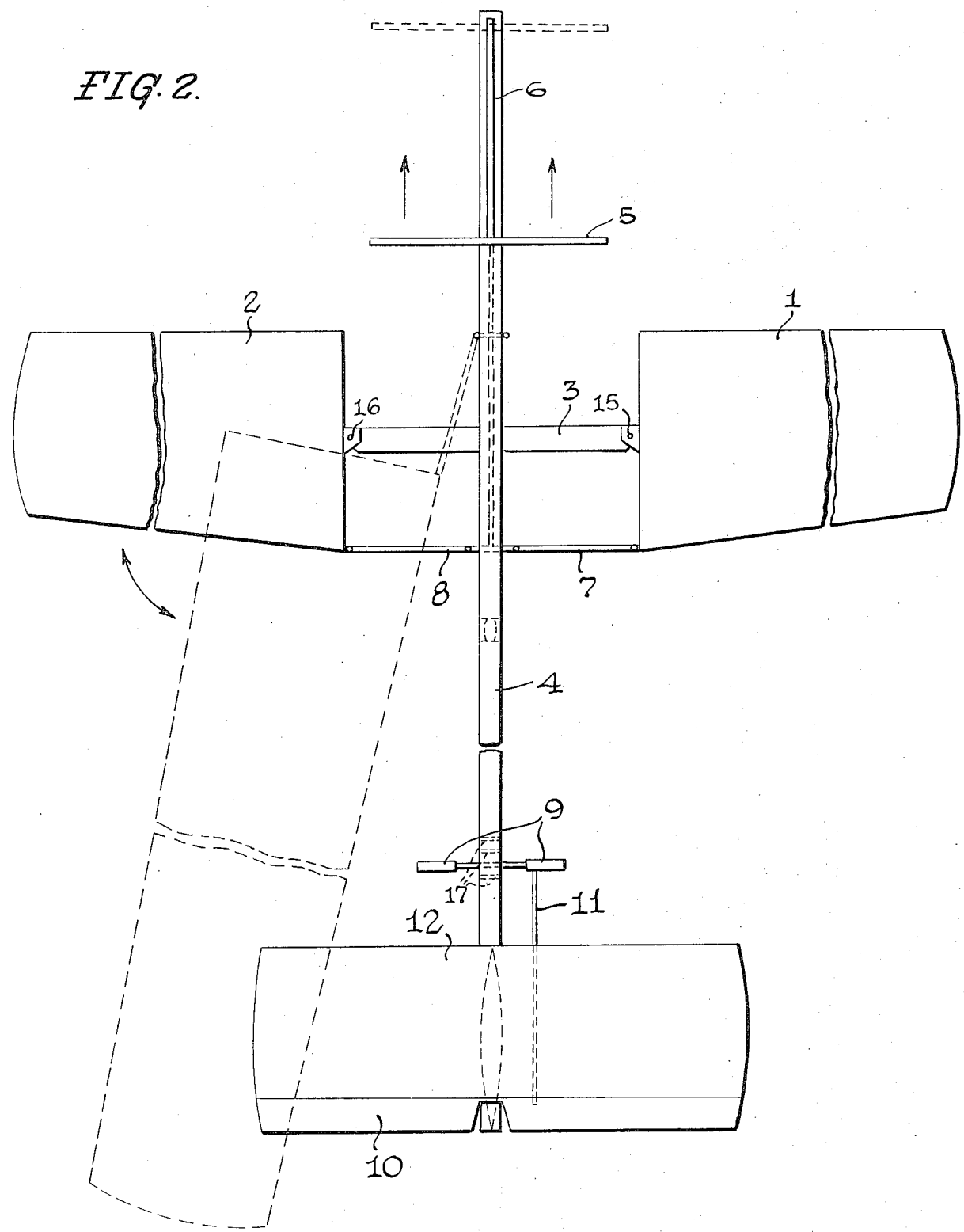

PARACHUTIST'S GLIDER

BACKGROUND

This invention relates generally to aircraft and more specifically pertains to a sailplane or glider for use by a parachutist.

The sport of skydiving includes a period of free-fall. It is an object of this invention to replace this free-fall with an extended, controllable flight. The unique features of this invention enable a parachutist to exit an aircraft with this device and glide through the air, utilizing thermals for lift, until suitable altitude for deployment of the parachute is attained. This craft is not designed to provide a landing but to supplement the parachute as a means for descent.

A further object of this invention is to enable the skydiver to travel much greater distances after leaving the jump airplane; and to provide greater degrees of accuracy in achieving specified landing zones.

BRIEF DESCRIPTION OF THE DRAWINGS

Other objects and advantages of this invention will become more apparent and understood from the following detailed specification and accompanying drawings in which:

FIG. 2 is a top plan view of the glider; and,

DESCRIPTION OF A PREFERRED EMBODIMENT

Figure 1:
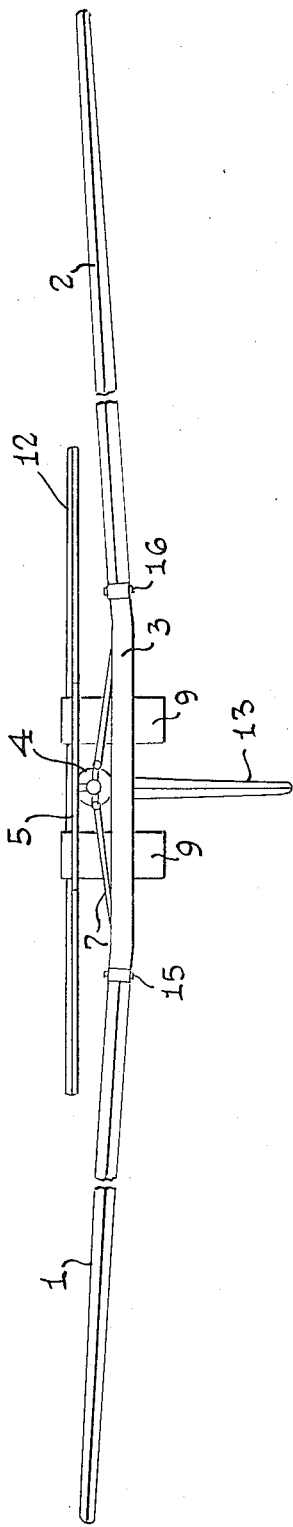
FIG. 1 is a front elevation view of a preferred embodiment of the glider in accordance with the present invention.
Figure 3:
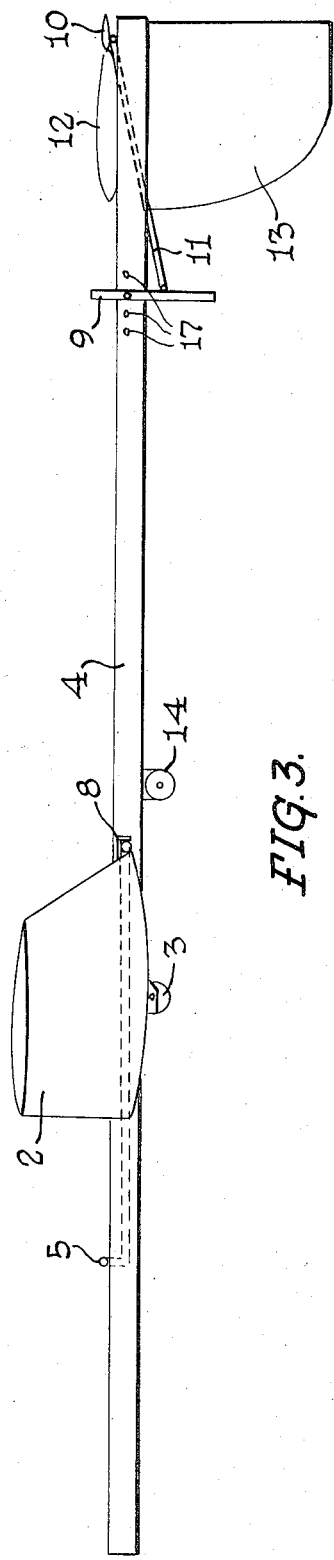
FIG. 3 is a side elevation view of the glider.

Referring now to the details of the invention as shown in FIGS. 1, 2, and 3 of the drawings, reference numerals 1 and 2 indicate right and left wings respectively which provide the lift for the craft. These wings are joined by a member 3, which is secured to the fuselage 4, as seen in FIG. 2. Pedals 9 are mounted on the fuselage 4 via a hinge (not shown) which allows them to control elevators 10 by control rod 11. The elevators 10 are conventional fixed wing aircraft control surfaces as is the tail 12. Stabilizer 13 is positioned on the underside of the craft to encounter an undisturbed airflow and to be out of the parachutists' way. Handbar 5 slides in a track 6 and controls the wings 1 and 2 via rods 7 and 8. The wings pivot in a horizontal plane on hinges 15 and 16 attached to the ends of member 3, as seen in FIG. 2. Reel 14 contains a strong, light weight safety line and has a spring (not shown) which will retract this line.

In use and operation, the parachutist adjusts the foot pedals 9 by means of adjustment holes 17 to position his center of gravity over member 3 before leaving the ground. The wing span is reduced by moving hand hold 5 to its forward most position. A simple latch can retain the hand hold in this position. The glider is then taken to sufficient altitude to be operative.

The parachutist mounts the glider upon his exiting from the airplane and attaches the safety line on reel 14 to his parachute harness. The hand bar 5 is moved to its rear most position thus fully spreading wings 1 and 2 via rods 7 and 8. Obviously this wing movement can be accomplished by various employment of springs and levers the extent of which are too various to detail. The glider is now controllable with the elevators being operated by the foot pedals 9 and the yaw for turning being induced by the operator shifting his weight toward the direction he wishes to yaw the craft. The glider is flown not unlike a sailplane, using air currents and thermals to prolong its flight if desired, until suitable altitude for deployment of the parachute is attained.

To terminate the flight, the operator leaves the glider and deploys his parachute. The glider than hangs from the parachute harness via the safety line. This line is released from the harness, when the parachutist lands, to prevent entanglement. Thus the construction of the glider enables it to be mounted by the skydiver as he jumps from an aircraft, provides him with an extended and controllable flight heretofore unattainable, and allows him to land by parachute unencumbered by the glider.

What is claimed is:

1. A gliding structure for use by a parachutist, said gliding structure comprising:
   a. a fuselage upon which the parachutist lies prone;
   b. a tail assembly attached to the rear of said fuselage, said tail assembly including hinged elevators controllable by foot pedals mounted on said fuselage and further including a downwardly extending vertical rudder; and,
   c. wings pivotably joined to said fuselage whereby said wings are moveable in a horizontal plane to vary the wing span of said gliding structure.

2. The gliding structure of claim 1 wherein said foot pedals mounted on said fuselage for control of said elevators are adjustable fore and aft on said fuselage.

3. The gliding structure of claim 1 further including:
   a. a hand bar assembly slidably mounted on said fuselage; and,
   b. rod means connected between said pivotable wings and said hand bar assembly whereby said pivotable wings may be moved by said parachutist by movement of said slidable hand bar assembly.

4. A gliding structure for use by a parachutist, said gliding structure comprising:
   a. a fuselage upon which the parachutist lies prone;
   b. a tail assembly attached to the rear of said fuselage, said tail assembly including hinged elevators controllable by foot pedals mounted on said fuselage, and further including a downwardly extending vertical rudder;
   c. wings pivotably joined to said fuselage whereby said wings are moveable to vary the wing span of said gliding structure;
   d. a hand bar assembly slidably mounted on said fuselage; and,
   e. rod means connected between said pivotable wings and said hand bar assembly whereby said pivotable wings may be moved by said parachutist by movement of said slidable hand bar assembly.

5. The gliding structure of claim 4 wherein said foot pedals mounted on said fuselage for control of said elevators are adjustable fore and aft on said fuselage.

6. The gliding structure of claim 4 further including a safety line attached to said fuselage of said gliding structure.

* * * * *